(12) United States Patent
Morris

(10) Patent No.: US 7,576,772 B2
(45) Date of Patent: Aug. 18, 2009

(54) METHOD FOR SPECIFYING IMAGE HANDLING FOR IMAGES ON A PORTABLE DEVICE

(75) Inventor: Robert P. Morris, Raleigh, NC (US)

(73) Assignee: FotoMedia Technologies, LLC, Portsmouth, NH (US)

( * ) Notice: Subject to any disclaimer, the term of this patent is extended or adjusted under 35 U.S.C. 154(b) by 1024 days.

(21) Appl. No.: 10/813,723

(22) Filed: Mar. 31, 2004

(65) Prior Publication Data

US 2005/0256943 A1 Nov. 17, 2005

(51) Int. Cl.
*H04N 5/225* (2006.01)
*H04N 5/222* (2006.01)
*H04N 7/173* (2006.01)

(52) U.S. Cl. ............... 348/207.1; 725/105; 348/333.02

(58) Field of Classification Search ................. 725/105; 709/209, 211, 220; 348/207.1
See application file for complete search history.

(56) References Cited

U.S. PATENT DOCUMENTS 6,223,190 B1  4/2001  Aihara et al.
6,243,538 B1  6/2001  Okuno
6,762,791 B1  7/2004  Schuetzle
7,117,519 B1 * 10/2006  Anderson et al. ........... 725/105
7,283,158 B1 * 10/2007  Shiohara et al. .......... 348/207.1

* cited by examiner

*Primary Examiner*—Tuan V Ho
*Assistant Examiner*—Selam T Gebriel

(57) ABSTRACT

A method and system for enabling a user to specify and automate file handling in a portable image capture device is provided, wherein the device includes at least one stored file and is capable of communicating with a computer over a network. An action list is downloaded from the computer, wherein the action list includes a mapping of one or more user input events on the device to one or more file handling actions. When an input event on the device is detected that matches one of the events in the downloaded action list, the corresponding file handling action is then performed on the file within the device. In a preferred embodiment, prior to the action list being downloaded, the user is allowed to configure the action list on the computer by mapping one or more user input events on the device to one or more file handling actions.

32 Claims, 5 Drawing Sheets

| Input Event | Action | Executable File | Parameters |
|---|---|---|---|
| Capture | Post to Web | webposterv3a.exe | URL=www.ipac.com<br>UN/PW="joe";"8m47" |
| | | | |
| | | | |
| | | | |

Action List 24

FIG. 4

METHOD FOR SPECIFYING IMAGE HANDLING FOR IMAGES ON A PORTABLE DEVICE

FIELD OF THE INVENTION

The present invention relates to configuring an image capture device, and more particularly to specifying and automating image handling capabilities in a portable image capture device from a remote computer.

BACKGROUND OF THE INVENTION

The integration of digital-camera technology with wireless hand-held electronic devices, such as mobile phones and personal digital assistants (PDAs) is now common place. A user of a camera phone, for example, can now snap digital images directly from the device and the images are then stored in the device on internal flash memory.

Wireless camera devices also allow users to manipulate the images on the device. For example, digital cameras, PDAs and camera phones allow users to send images to other network connected devices, attach images to email and MMS messages, store images in specific locations on the device or on the network, create and send post cards with images, order prints, and so on. Another popular image handling feature is to allow the user to upload pictures from phone directly to an online photosharing site. Using a web browser on a PC, or even a browser on the phone, the user can then visit the photosharing website to edit their pictures, create albums that can be viewed as slideshows by visitors, and/or create email postcards. Advanced functions include turning the wireless device into a mobile photo album that allows the user to organize, view, and send favorite photos to friends by downloading pictures from photosharing site to the wireless device.

Although there are many options available today for enabling a user to manipulate images on a hand-held wireless device, many users don't take advantage of these capabilities because the user interfaces for these devices make the tasks too difficult. For instance, due to a cell phone's small screen and numeric keypad instead of a keyboard, scrolling through a list of images for selection and then entering one or more email addresses just to send an email with an attached image can be extremely tedious and time consuming.

As the number of management functions or actions that the user would like to perform grows, so does the time involved and complexity of using the device. For example, one can imagine the number of button presses involved with selecting a group of images, uploading the images to a particular website, and then ordering prints for the images from the website, all from a camera phone. This user interface problem on small portable devices is applicable not only to the management of image files, but also to the management of any other type of electronic file.

Accordingly, what is needed is a method that enables users to take advantage of the data handling capabilities of handheld imaging devices that minimizes the interaction between the user and the device itself. The present invention addresses such a need.

SUMMARY OF THE INVENTION

The present invention provides a method and system for enabling a user to specify and automate file handling in a portable image capture device, wherein the device includes at least one stored file and is capable of communicating with a computer over a network. The method begins by downloading an action list from the computer to the device, wherein the action list includes a mapping of one or more user input events on the device to one or more file handling actions. When an input event on the device is detected that matches one of the events in the downloaded action list, the corresponding file handling action is then performed on the file within the device. In a preferred embodiment, prior to the action list being downloaded, the user is allowed to configure the action list on the computer by mapping one or more user input events on the device to one or more file handling actions.

In a further aspect of the present invention, any code necessary to execute the functions are also downloaded to the device, thereby saving storage space on the device. Because the action list is not configured on the device, but rather on a separate computer that has a better user interface, the present invention minimizes the interaction between the user and the device, while taking full advantage of the image handling capabilities of the portable electronic device through automation.

BRIEF DESCRIPTION OF THE DRAWINGS

FIG. 4 is a diagram illustrating an example entry in the action list.

DETAILED DESCRIPTION OF THE INVENTION

The present invention relates to specifying and automating image handling capabilities in a portable image capture device. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In a preferred embodiment, the present invention provides a method and system for specifying and automating image handling in a portable image capture device. The present invention allows the user to specify using a PC interface or web browser an action or set of actions that are to take place for each specified image or set of images on the portable image capture device when a specified event or user input on the device occurs. That is, event(s) and/or user input related to an image or set of images on the device is mapped to a set of actions to be automatically performed on the related images when the user input sequence is detected on the device. In a further aspect of the present invention, any code necessary to execute the functions are also downloaded to the device, thereby saving storage space on the device. By configuring the action lists on a separate device that has a better user interface and downloading the action list to the device to automate image handling functions of the portable electronic device, the present invention takes advantage of the image handling capabilities of the portable electronic device, while minimizing the interaction between the user and the portable image capture device.

Figure 1:
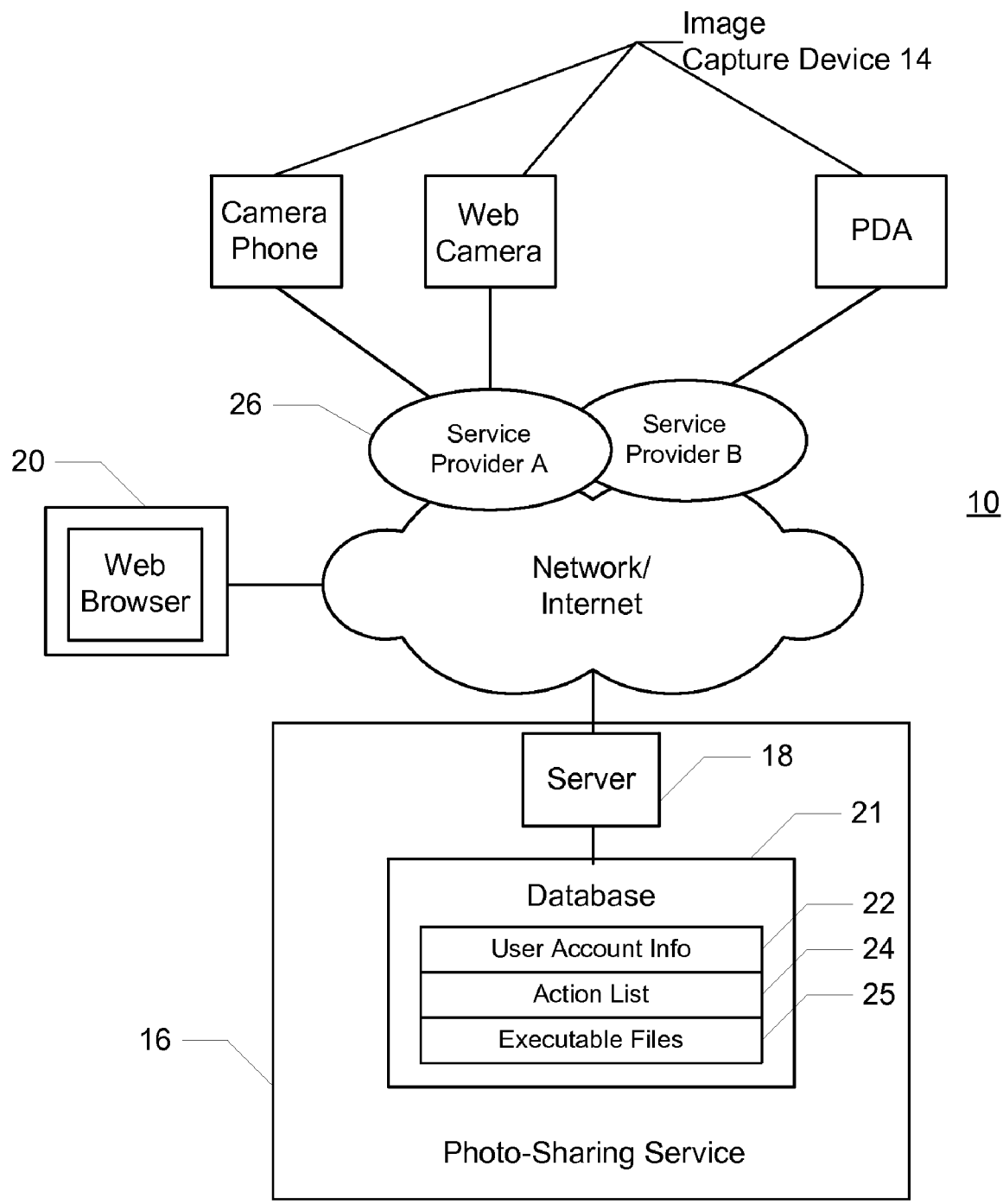
FIG. 1 is a block diagram illustrating a system for specifying and automating image handling in a portable image capture device in accordance with a preferred embodiment of the present invention.

FIG. 1 is a block diagram illustrating a system for specifying and automating image handling in a portable image capture device in accordance with a preferred embodiment of the present invention. The system 10 includes a plurality of portable image capture devices 14 and a site on a network for storing images from the phones 14, referred to herein as online photo-sharing service 16. In a preferred embodiment, the image capture devices 14 may be camera-enabled cell phones, web-enabled digital cameras, and camera-enabled PDAs, for instance. To provide better context for the invention, the image capture devices 14 will hereinafter be referred to as camera phones 14. Besides performing the functions of a cellular phone, the camera phones 14 are capable of capturing digital images and storing the images on an internal memory. Because the camera phones 14 have limited storage capacity, the camera phones 14 are provided with the capability of uploading the captured images to the online photo sharing service 16, which has practically unlimited storage capacity.

The online photo-sharing service 16 includes a server 18 for receiving the images and an image database 21 for storing the images. Once uploaded, the images may be stored in the user's account and organized into online web albums. Once the images are stored at the photo-sharing site 16, the images may be viewed and managed over the Internet through a web browser running on the user's computer 20.

The server 16 maintains one or more databases 21 for storing user account information 22 (e.g., login/password, account no., user preferences, and the user's images and albums), and an action list 24, explained further below.

In operation, the portable image capture devices 14 have the processing power to execute software programs and perform a variety of file handling tasks. The type of files handled by the device 14 will be described in terms of the preferred embodiment, where the files are digital images, but any file type may by used, such as, MP3, MPEG, and text, for instance. Regardless of the type of file, the problem is that due to the size of the portable device 14, the user interface of the device 14 is not conducive to users manually performing file handling tasks by entering complicated key sequences on the device 14.

The present invention solves this problem by taking advantage of the user interface (UI) of the computer 20 and server 18 and enabling the user to automate the file handling capabilities of the portable image capture device 14 by configuring an action list 24 by mapping one or more user input events on the device to one or more image handling actions. The user may optionally create more than one action list 24 for different circumstances.

Once the device 14 is activated, the action list 24 is downloaded to the device 14 from the server 18. The transfer of the action list can be initiated by the device 14 or the computer 20. It may be done automatically (e.g. at regular intervals or based on some event, such as device startup) or may be initiated by user input to either the device 14 or the computer 20.

After the user activates the device 14, the device 14 detects user input events (i.e., key sequences) and determines whether a user input event that involves an image or other data file matches one of the events in the mappings. If so, the device 14 automatically performs the corresponding action or actions on the image or data file within the device 14. Thus, the present invention allows the user to specify and configure the image handling capabilities of the portable image capture device 14 using a separate computer that has more user friendly interface.

It is recognized that the device 14 has limited memory and therefore to store all executable code necessary for each image handling function would be prohibitive. Therefore, in a further aspect of the present invention, any executable code associated with an action to be performed may be downloaded to the device 14 and executed in order to perform the action.

In an alternative embodiment, the present invention may be used in a home network where configuration of the action lists 24 occurs on a computer in the home network and the computer wirelessly transmits the action list 24 to the device 14. In this embodiment, use of the server 18 for the configuration of the action list 24 would be unnecessary.

In a preferred embodiment, cellular telephone services for the camera phones 14 are provided by a service provider 26, which may also be the same provider that provides the online photo-sharing service 16. However, the online photo-sharing service 16 may be provided by a third party. As such, the third party photo-sharing service may make the photo-sharing service 16 available to multiple service providers 26. Access to the online photo-sharing service 16 may be through the Internet or a private cellular network. In the embodiment where the devices 14 are digital cameras, the devices 14 may be provided with wireless connectivity for connecting to the Internet, and are therefore considered "web-enabled" devices, although a wired connection method may also be used. The cameras may connect to the Internet via a service provider, which may include a wireless carrier and/or an Internet service provider (ISP).

Figure 2:
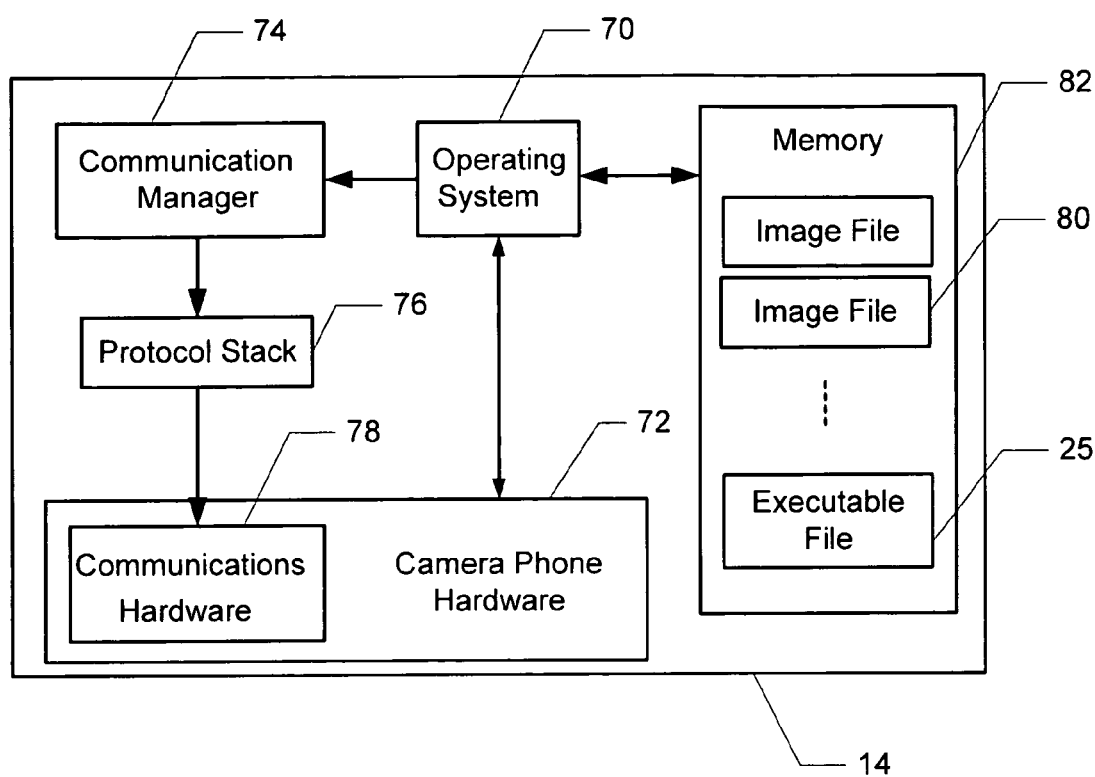
FIG. 2 is a block diagram illustrating an example camera phone architecture for use in accordance with the present invention.

Referring now to FIG. 2, a block diagram illustrating an example camera phone architecture for use in accordance with the present invention is shown. Preferably, the camera phone 14 includes a microprocessor-based architecture that runs an operating system 70 for controlling camera hardware 72 and overall functionality of the camera phone 14 (e.g., taking pictures, storing pictures, and the like). A memory 82, which may comprise flash memory or other type of non-volatile memory, is provided to store capture images as image files 80. The memory 82 may also store executable program files 25 that have been downloaded from the server, explained below.

The camera phone 14 also includes communication manager software 74, and a TCP-IP protocol stack 76, that enables communication via the Internet, as is well-known in the art. The protocol stack 76, under direction of the communications manager interfaces with the communications hardware 78 of camera. The protocol stack 76 includes software APIs and protocol libraries that interface with the communication manager 74 and communication hardware interface drivers that interface directly with the various communications hardware 78 that provides the camera phone 14 with wireless connectivity (e.g., the transmitter and receiver, etc.). The communication hardware 78 also includes the user interface buttons necessary for operating the device 14. As the user operates the device by interacting with the user interface, the input events are relayed to the operating system 70. The communication manager 74 communicates with operating system 70, the IP protocol stack 76, and the communications hardware 78 to establish a network connection and to transmit information and the image files 80 from the memory 82 to the photo-sharing service 16, and to receive the action list 24 and executable files 26.

In the embodiment where the device 14 is a digital camera, the communications hardware 78 may provide wireless connectivity using anyone of a variety of methods. For example, a cellphone may be used to provide the digital camera phone 14 with wireless capability, where the camera is connected to the cellphone via a cable or some short-range wireless communication, such as Bluetooth. Alternatively, the camera could be provided with built-in cellphone-like wireless communication. In an alternative embodiment, the digital camera is not wireless, but instead uses a modem for Internet connectivity. The modem could be external or internal. If external, the camera 14 could be coupled to modem via any of several communications means (e.g., USB, IEEE1394, infrared link, etc.). An internal modem could be implemented directly within the electronics of camera (e.g., via a modem ASIC), or alternatively, as a software only modem executing on a processor within camera. As such, it should be appreciated that, at the hardware connectivity level, the connection with the server 18 can take several forms. Hence, it should be appreciated that the present invention is not limited to any particular method of accessing the Internet.

Figure 3A:
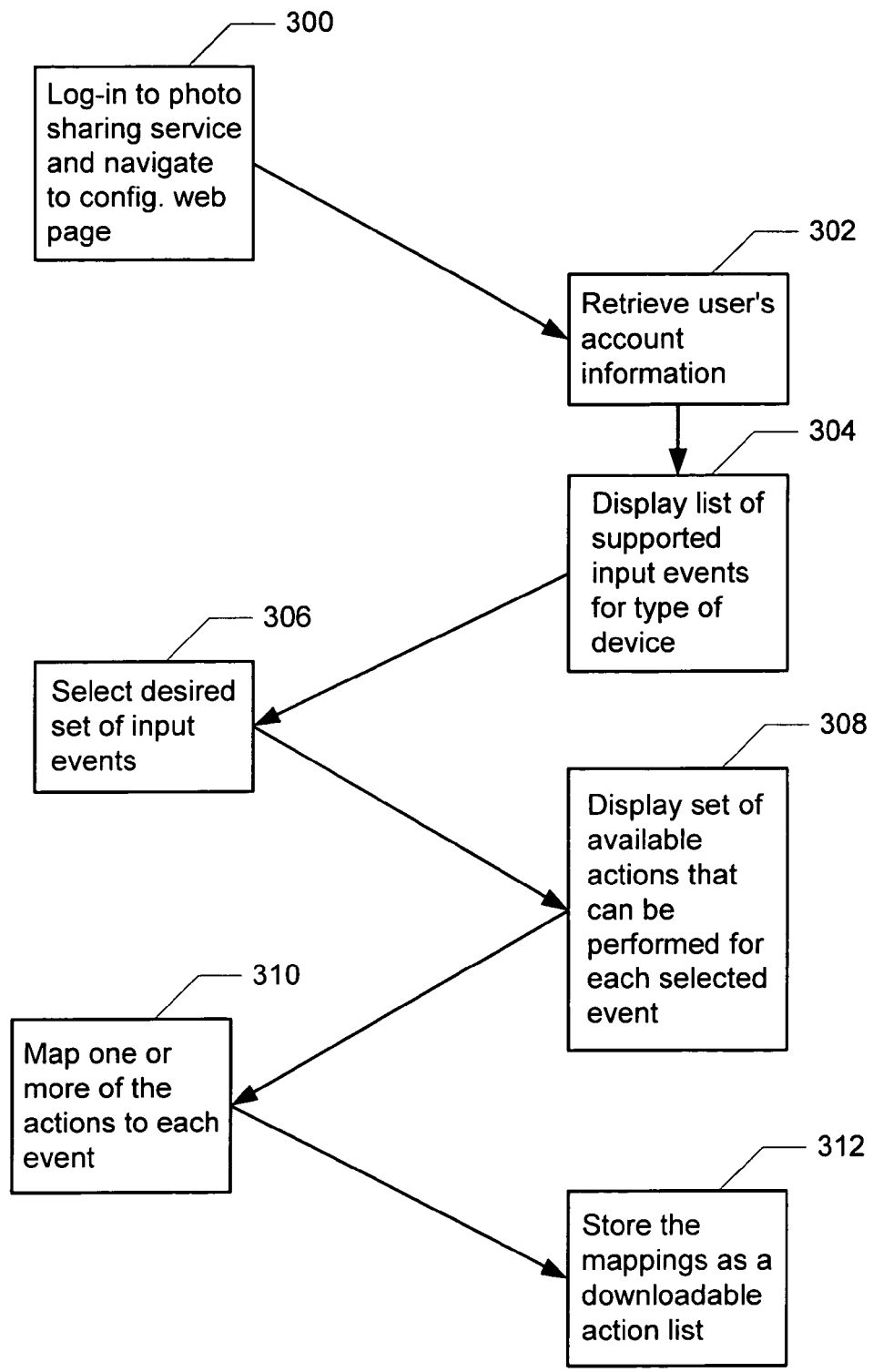
FIGS. 3A and 3B are flow diagrams illustrating the process for specifying and automating image handling in the portable image capture device.
Figure 3B:
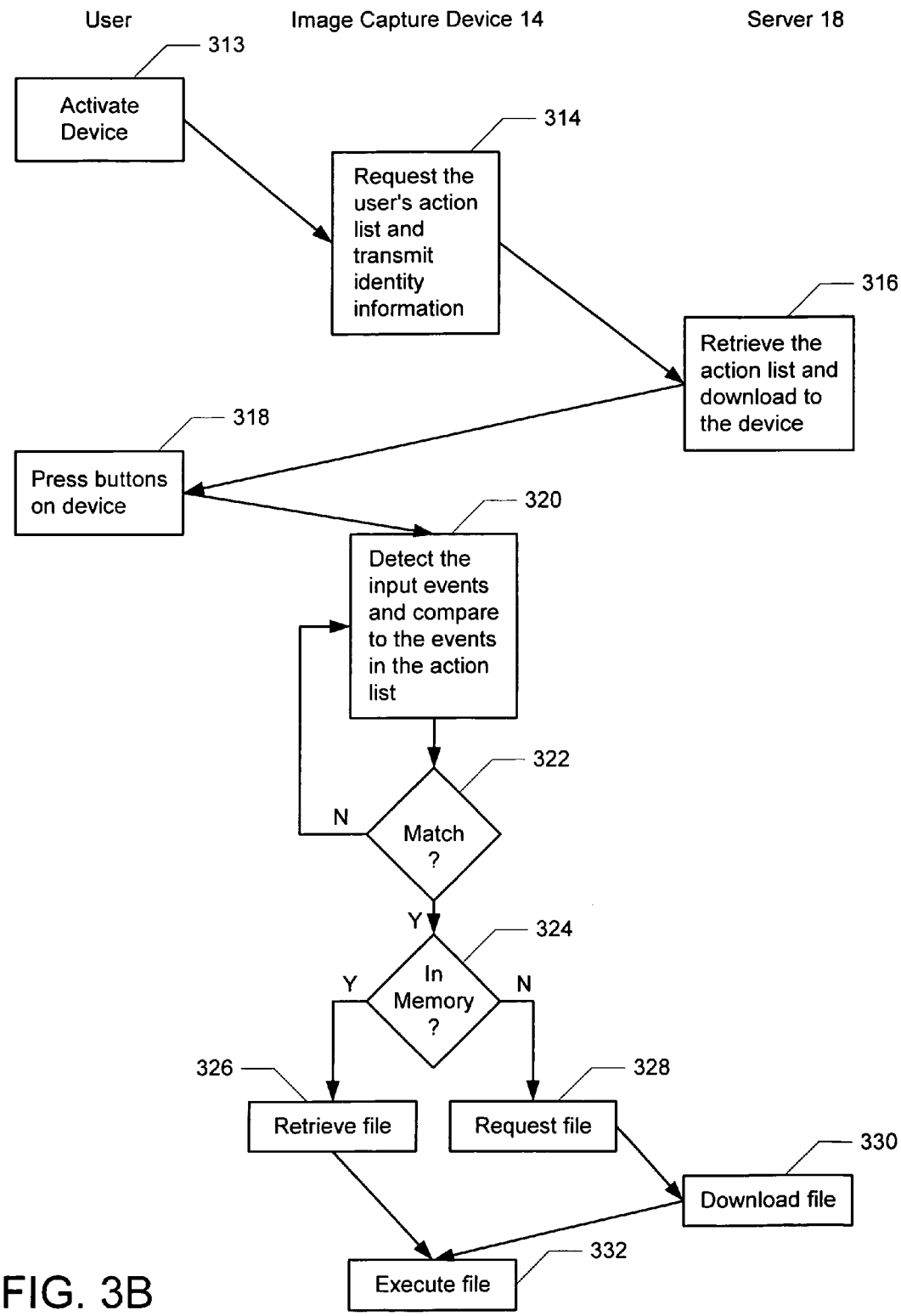

FIGS. 3A and 3B are flow diagrams illustrating the process for specifying and automating image handling in the portable image capture device 14. FIG. 3A illustrates the process for configuring the portable image capture device 14 for automatic image handling using a remote computer 20, while FIG. 3B illustrates the process during operation of the portable device 14.

Referring to FIG. 3A, the process begins in step 300 when the user logs-in to the server 18 from the computer 20 and navigates to an image handling configuration web page. This step necessarily assumes that the user has purchased a camera phone 14 and is aware of the automatic configuration service offered by the service provider 26. The user could be made aware of the service through a flyer in the phone packaging or from the service provider's web site while the user is managing his or her account.

In response to the user navigating to the configuration page, the server 18 retrieves the user's account information from the database 21 in step 302, which includes the type of camera phone 14 the user has as well as the operating environment of the phone 14 including display and processing capabilities. In step 304, the server 18 displays a list of supported user interface input events specific to the user's type of self camera phone 14. As used herein, input events refer to any combination of one or more key sequences entered by the user by pressing buttons and/or entering voice commands on the camera phone 14. Example input events include the activation of the shutter button, and selecting an image for an email attachment.

In step 306, the user selects a desired set of input events (preferably by clicking check boxes or selection from a pull-down menu) that he or she intends to program for some automatic action when that event occurs on the camera phone 14. After the user indicates he or she is done with the selection, the server in step 308 displays a set of available actions that can be performed/executed when each selected event occurs.

The available actions that can be performed for a particular event can be explained by way of the following examples. In the first example, assume that the user wants to specify an action, set of actions, or sequence of actions that is to be performed each time an image is captured by the device. Examples of the types of actions that can be specified include: 1) e-mailing the image(s) to one or more pre-selected individuals, 2) posting the image to the photo sharing service 16, 3) posting the image to a specified web site, 4) resizing and saving the image, 5) saving the image to a folder, submitting the image(s) into a workflow process along with additional data either specified by the user or collected by the device, 6) submitting an order for prints for the image(s), 7) creating a book or calendar using the image(s), and so on.

In the second example, the user wants to specify an action, set of actions, or sequence of actions that is to be performed each time an image or images are selected (an input event within a particular application or not) and a particular input key on the device is pressed. This enables the user to setup "hot keys" associated or voice commands associated with an action, set of actions, or sequence of actions.

Referring again to FIG. 3A, after the set of available actions are displayed for each event, the user maps one or more of the actions to each event in step 310. Referring again to FIG. 1, the database 21 also stores action executable files 25 for the actions that can be performed, which are executable versions of the software necessary to perform the corresponding action on the camera phone 14. There may be many versions of each executable file 25 corresponding to the different types of camera phone operating environments that the files may be executed on. Consequently, referring again to FIG. 3A, after step 310, the server 18 completes the mappings by using the user's camera type to find the action executable file 25 appropriate for that type of camera phone 14 and indicates the name of the executable file 25 next to the corresponding action in the action list 24 and includes any other parameters necessary to perform the action; and then storing the completed mappings as a downloadable action list 24 in step 312.

FIG. 4 is a diagram illustrating an example entry in the action list 24. In this example, assume that the user wants to configure the camera to post each image that the camera captures to a specified web site immediately after each image is captured. The user would select "Capture" as the event, and then map the action "Post to Web" to that event. The user would also be prompted to enter the URL of the specified web site and any necessary login information. The server 18 would then store the mapped event and action, the name of the action executable, and the user entered parameters for the action as shown.

Referring now to FIG. 3B, once the user activates the device 14 in step 313, the device 14 periodically requests the action list 24 that was configured by the user from the server 14 in step 314. In a preferred embodiment, the device 14 also transmits identity information along with the request that identifies the device 14 and/or the owner. In response to receiving the request, the server in step 316 uses the identity information to retrieve the action list 24 configured by the user and downloads the action list 24 to the device 14.

In step 318, during user operation of the device, the user interacts with the UI of the device by pressing buttons etc, which initiates input events. In step 320 the device 14 detects the input events and compares the input events to the events in the action list 24. If a match occurs in step 322, the device 14 attempts to perform the corresponding action or actions in the list 24 by first retrieving the executable file 26 necessary to execute that action. The device 14 preferably first determines if the executable file 26 is present in the device memory 82 in step 324. If the executable file 26 is present, the device 14 retrieves the file in step 326, and executes the file 26 in step 332, thereby performing the action. If the executable is not present in memory 82, then the device 14 requests the executable file 26 from the server 18 in step 328. In response, the server 18 downloads the version of the executable file 26 appropriate for the device 14 in step 330, and the device executes the file 26 in step 332. In a preferred embodiment, the performance of the action takes place entirely on the device 14. However, the action may also be performed by one or more cooperating devices and/or computers/servers. After receiving the file 26, the device may either store the downloaded executable file 26 in memory 82 for later use or discard the file 26 to save space.

In an alternative embodiment, rather than downloading the executable files on demand as described, the server may download all the executable files 25 associated with the actions in the action list 24 at the same time the action list 24 is downloaded. This embodiment is preferable for devices that have storage capacity necessary to store the executable files 25. Also in an alternative embodiment, when the device requests the action list from the server, the device may send operating environment information to the server with the request, such that the computer downloads the executable file that is compatible with the device's operating environment.

The methods described herein can be embodied in executable instructions stored in a computer-readable medium for use by or in connection with an instruction execution machine, system, apparatus, or device, such as a computer-based or processor-containing machine, system, apparatus, or device. As used here, a "computer-readable medium" can include one or more of any suitable media for storing the executable instructions of a computer program in one or more of an electronic, magnetic, optical, and electromagnetic form, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a random access memory (RAM); a read only memory (ROM); an erasable programmable read only memory (EPROM or Flash memory); optical storage devices, including a portable compact disc (CD), a portable digital video disc (DVD), and the like.

A method for specifying and automating file handling in a portable image capture device has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim

1. A method for specifying and automating file handling in a portable image capture device the portable image capture device including at least one stored file and configured to communicate with a computer, the method comprising:
   In response to a user configuring an action list on the computer by mapping one or more user input events detectable on the portable image capture device to one or more file handling actions on the at least one stored file, downloading the action list from the computer to the portable image capture device;
   performing, on the at least one stored file included in the portable image capture device the corresponding file handling action on the at least one stored file within the portable image capture device when an input event on the portable image capture device is detected that matches one of the user input events in the action list; and
   retrieving an executable file necessary to perform the corresponding file handling action, wherein retrieving the executable file necessary to perform the corresponding file handling action includes:
   determining when the executable file is present in memory of the portable image capture device; and
   when the executable file is present in the memory, retrieving and executing the executable file from the memory, thereby performing the action.

2. The method of claim 1 further comprising:
   downloading an executable file associated with the corresponding file handling action to the portable image capture device; and
   executing the executable file in the device in order to perform the file handling action.

3. The method of claim 2 wherein downloading the executable file associated with the file handling action to be performed comprises downloading the executable file corresponding to the file handling action when the action is to be performed.

4. The method of claim 2 further comprising downloading all executable files associated with the file handling actions in the action list at the time the action list is downloaded.

5. The method of claim 1 wherein the at least one stored file comprises a digital image captured by the portable image capture device.

6. The method of claim 1 wherein the computer is used to access a server via a web browser, the method further comprising configuring the action list on the server in response to user input.

7. The method of claim 6 further comprising retrieving the user's account information, including the device type and an operating environment of the device in response to the user logging into the server.

8. The method of claim 7 further comprising displaying to the user a list of supported user interface input events specific to the user's type of device for the user to select a desired set of input events.

9. The method of claim 8 further comprising displaying a set of actions that can be performed on the portable image capture device when each selected event occurs for the user to map one or more actions to each event.

10. The method of claim 9 wherein the set of actions may include any combination of e-mailing the file as an attachment, posting the file to a photo sharing service, posting the file to a specified web site, resizing if the file is an image, and saving the file to a folder.

11. The method of claim 9 further comprising storing the mappings as a downloadable action list.

12. The method of claim 1 further including requesting the action list from the computer by the device.

13. The method of claim 12 further comprising:
   transmitting identity information from the device to the server for the server to use to retrieve the action list configured by the user; and
   downloading the action list to the device.

14. The method of claim 13 wherein performing the corresponding file handling action includes downloading an executable file that is compatible with the device's operating environment.

15. The method of claim 14 wherein the device sends operating environment information to the server in the request in order for the server to find the action executable file appropriate for the device's operating environment.

16. The method of claim 1 further comprising:
   When the executable is not present in the memory of the portable image capture device:
      Retrieving the executable file from the computer; and
      Executing the executable file.

17. A computer-readable medium encoded with computer executable instructions for specifying and automating file handling in a portable image capture device, the portable image capture device including at least one stored file and configured to communicate with a computer, the instructions, when executed:
- downloading an action list from the computer to the portable image capture device, the action list comprising a mapping of one or more user input events on the portable image capture device to one or more file handling actions on the at least one stored file;
- performing on the file, corresponding file handling action within the portable image capture device when an input event is detected on the portable image capture device that matches one of the events in the downloaded action list;
- detecting the input events on the device;
- comparing the detected input events to the events listed in the downloaded action list; and
- when a match occurs, performing the corresponding action or actions in the list by retrieving the executable file necessary to execute that action, wherein retrieving the executable file necessary to execute that action includes:
- determining when the executable file is present in memory of the portable image capture device; and
- when the executable file is present in the memory, retrieving and executing the executable file, thereby performing the action.

18. The computer-readable medium of claim 17 further comprising providing an interface that allows a user to configure the action list.

19. The computer-readable medium of claim 17 further including instructions for downloading an executable file associated with the file handling action to be performed and executing the executable file in the device in order to perform the action.

20. The computer-readable medium of claim 19 further comprising instructions for downloading the executable file corresponding to the file handling action when the action is to be performed.

21. The computer-readable medium of claim 19 further including instructions for downloading all the executable files associated with the actions in the action list at the time the action list is downloaded.

22. The computer-readable medium of claim 17 wherein the at least one stored file comprises a digital image captured by the portable image capture device.

23. The computer-readable medium of claim 17 wherein the computer is used to access a server via a web browser, the computer-readable medium having further instructions for configuring the action list on the server in response to user input.

24. The computer-readable medium of claim 23 further comprising instructions for retrieving the user's account information, including the device type and an operating environment of the device in response to the user logging into the server.

25. The computer-readable medium of claim 23 having further instructions for displaying to the user a list of supported user interface input events specific to the user's type of device for the user to select a desired set of input events.

26. The computer-readable medium of claim 25 having further instructions for:
- displaying a set of available actions that can be performed when each selected event occurs; and
- providing an interface for the user to map one or more actions to each event.

27. The computer-readable medium of claim 26 wherein the set of available actions may include any combination of e-mailing the file as an attachment, posting the file to a photo sharing service, posting the file to a specified web site, resizing if the file is an image, and saving the file to a folder.

28. The computer-readable medium of claim 26 having further instructions for storing the mappings as a downloadable action list.

29. The computer-readable medium of claim 23 having further instructions for requesting the action list from the computer.

30. The computer-readable medium of claim 29 having further instructions for transmitting identity information from the device to the server for the server to use to retrieve the action list configured by the user and downloading the action list to the device.

31. The computer-readable medium of claim 23 having further instructions for downloading an executable file that is compatible with the device's operating environment.

32. The computer-readable medium of claim 17 having further instructions for:
- When the executable is not present in the memory:
- Requesting the executable file from the computer; and
- Executing the executable file once received.

* * * * *